US009852500B2

(12) United States Patent
Rourke et al.

(10) Patent No.: US 9,852,500 B2
(45) Date of Patent: Dec. 26, 2017

(54) GUIDED INSPECTION OF AN INSTALLED COMPONENT USING A HANDHELD INSPECTION DEVICE

(71) Applicant: GM GLOBAL TECHNOLOGY OPERATIONS LLC, Detroit, MI (US)

(72) Inventors: Rick F. Rourke, Metamora, MI (US); Robert J. Scheuerman, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 14/800,141

(22) Filed: Jul. 15, 2015

(65) Prior Publication Data

US 2017/0018067 A1 Jan. 19, 2017

(51) Int. Cl.
*G06T 7/00* (2017.01)
*G06T 7/60* (2017.01)
(Continued)

(52) U.S. Cl.
CPC .......... *G06T 7/0004* (2013.01); *G01B 11/022* (2013.01); *G06K 9/4604* (2013.01); *G06K 9/52* (2013.01); *G06T 7/13* (2017.01); *G06T 7/60* (2013.01); *H04N 5/23222* (2013.01); *H04N 5/23293* (2013.01); *G01B 11/24* (2013.01); *G01B 11/2513* (2013.01); *G06F 17/00* (2013.01); *G06F 17/30* (2013.01); *G06K 7/10881* (2013.01); *G06K 9/00201* (2013.01); *G06K 9/00208* (2013.01); *G06K 9/00214* (2013.01); *G06K 9/228* (2013.01);
(Continued)

(58) Field of Classification Search
None
See application file for complete search history.

(56) References Cited

U.S. PATENT DOCUMENTS 6,173,070 B1 * 1/2001 Michael ............ G06K 9/00201 382/145
2005/0256681 A1 * 11/2005 Brinton ................. G06Q 10/06 702/182
2007/0158428 A1 * 7/2007 Havens ............... G06K 7/0004 235/462.45
(Continued)

FOREIGN PATENT DOCUMENTS

DE 20111084786 B4 11/2013

*Primary Examiner* — Mohammed Rahaman
*Assistant Examiner* — William Adrovel
(74) *Attorney, Agent, or Firm* — Quinn IP Law

(57) ABSTRACT

A method for inspecting an installed component includes receiving an identity and selected location of the component as an input signal via a handheld inspection device having a controller, digital camera, and display screen, and collecting a dynamic pixel image of the selected location in real-time using the digital camera. The method includes displaying the image in real time via the display screen, projecting virtual guidance lines onto the image corresponding to edges of the installed component, and identifying the component via the controller when the image is aligned with the projected acquisition lines. A predetermined area of the installed component is identified after identifying the installed component, a predetermined feature dimension is measured within the identified predetermined area, and an output signal is generated with a status indicative of whether the measured feature dimension falls within a calibrated range.

20 Claims, 3 Drawing Sheets

10 14 20 50 11 13 51 18 12 16

(51) Int. Cl.

| | |
|---|---|
| ***G06T 7/13*** | (2017.01) |
| ***G06K 9/46*** | (2006.01) |
| ***G06K 9/52*** | (2006.01) |
| ***G06K 9/00*** | (2006.01) |
| ***G01B 11/02*** | (2006.01) |
| ***G01B 11/24*** | (2006.01) |
| ***G01B 11/25*** | (2006.01) |
| ***H04N 5/232*** | (2006.01) |
| ***G06F 17/00*** | (2006.01) |
| ***G06F 17/30*** | (2006.01) |
| *G06K 9/32* | (2006.01) |
| *G06K 9/22* | (2006.01) |
| *G06K 7/10* | (2006.01) |

(52) U.S. Cl.
CPC ....... *G06K 9/32* (2013.01); *G06K 2009/4666* (2013.01); *G06T 2207/30108* (2013.01); *G06T 2207/30204* (2013.01)

(56) References Cited

U.S. PATENT DOCUMENTS

| | | | | |
|---|---|---|---|---|
| 2012/0209470 | A1* | 8/2012 | Gilbert | G06F 17/30047<br>701/31.4 |
| 2013/0092735 | A1* | 4/2013 | Liu | G06K 7/10851<br>235/440 |
| 2013/0266228 | A1* | 10/2013 | Markson | G06Q 10/087<br>382/218 |
| 2014/0104414 | A1* | 4/2014 | McCloskey | G06Q 10/083<br>348/135 |
| 2014/0168661 | A1* | 6/2014 | Nygaard | G01B 11/02<br>356/601 |

* cited by examiner

GUIDED INSPECTION OF AN INSTALLED COMPONENT USING A HANDHELD INSPECTION DEVICE

TECHNICAL FIELD

The present disclosure relates to the guided inspection of an installed component using a handheld inspection device.

BACKGROUND

Manufacturing processes often require the interconnection of mating components into an assembly. For instance, fittings are used in pneumatic and hydraulic systems to fluidly connect lengths of conduit, while electrical wiring harnesses are used to electrically connect electric motors, batteries, sensors, indicator lights, and the like in electrical or electro-mechanical systems. With respect to wiring harnesses in particular, the male plugs and female jacks forming the individual electrical connectors disposed at ends of electrical cables forming the harness are typically secured via snap-fit connections. The use of such connections enables an operator to discern whether a proper plug-to-jack connection was made via subtle tactile and/or audible feedback. However, it can be difficult to accurately detect and verify component connections on a consistent basis across multiple work shifts or between different operators performing the same assembly task, particularly when installing components in a space-limited environment.

SUMMARY

A method and a handheld inspection device are disclosed herein that are intended to facilitate the inspection of an installed component. The method and device can be used with any type of installed component having two or more mating portions whose relative positioning is an important inspection criterion. For illustrative consistency, the installed component is described herein as an example snap-lock electrical connector having a plug and jack of the type noted above without limiting the approach to such a design or application.

An example method for inspecting an installed component includes orienting a digital camera of the handheld inspection device with respect to a selected location of the installed component, and then displaying a dynamic pixel image of the installed component via a display screen of the device. The method further includes projecting onto the display screen a set of virtual acquisition guidance lines for the selected location, with the acquisition guidance lines corresponding to a predetermined orientation and size of a correctly installed component for the selected location. Once acquired, the installed component is automatically identified via a controller via execution of machine-readable gaging instructions. A first indicator may be provided via the display screen and/or other part of the handheld inspection device to visually indicate that the installed component has been identified.

Additionally, the method includes identifying a predetermined target area of the identified installed component via the processor, and may include providing a second indicator when the predetermined target area is subsequently identified by the controller. Thereafter, the controller executes the gaging instructions from memory of the handheld inspection device to thereby measure a feature dimension of the installed component within the identified predetermined target area. A third indicator may be activated or displayed by the controller when the measured feature dimension falls within a calibrated threshold distance indicative of a properly installed component.

The handheld inspection device includes the digital camera, display screen, and controller noted above. The controller includes a processor and machine-readable gaging instructions. The controller is programmed to receive an identity and a selected location of an installed component as an input signal, collect a dynamic pixel image of the selected location, e.g., real-time video, using the digital camera, and display the collected dynamic pixel image in real time via the display screen. Additionally, the controller projects a set of virtual acquisition guidance lines onto the displayed dynamic pixel image, with the projected acquisition guidance lines corresponding to edges of the installed component within the selected location. The controller activates a first indicator when the displayed dynamic pixel image is aligned with the projected acquisition lines, and activates a second indicator when a predetermined area of the installed component is identified. The controller is also caused to measure, via the processor using the gaging instructions, a predetermined feature dimension of the installed component within the identified predetermined area, and to activate a third indicator and generate an output signal via the processor. The third indicator has a status indicative of whether the measured feature dimension falls within a calibrated range.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
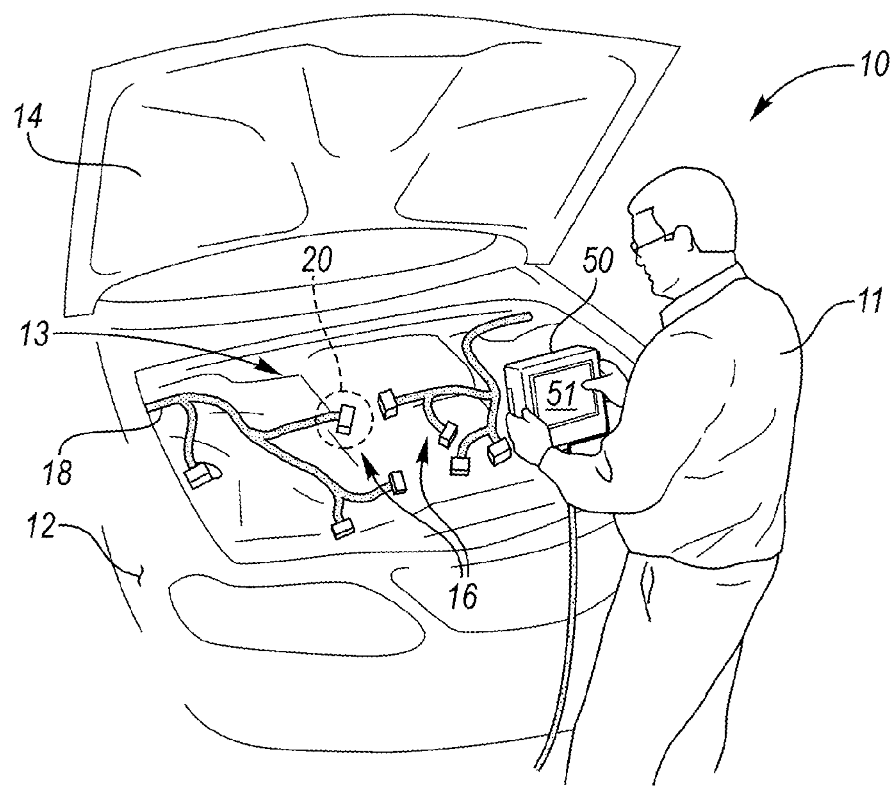
FIG. 1 is a schematic perspective view illustration of an operator using a handheld inspection device in the guided inspection of an installed component according to a method as set forth herein.

Referring to the drawings, wherein like reference numbers refer to like components throughout the several views, an example assembly 10 is shown in the form of a vehicle having a body 12 and a hood 14, with the body 12 defining an engine compartment 13 that is enclosed by the body 12 and the hood 14. A wiring harness 16 having electrical cables 18 and a set of installed components 20 in the form of electrical end connectors is disposed within the engine compartment 13. For illustrative consistency, the installed components 20 will be described hereinafter using the example electrical end connectors of FIG. 1 without limiting the scope to such an installed component. One of ordinary skill in the art will appreciate that the present approach may extend to any two mating pieces or subcomponents whose relative orientations and final installed positions are critical inspection concerns.

The installed components 20 may be, by way of example, male electrical plugs and female electrical jacks. Depending on the application, the wiring harness 16 may be used to route electrical power from a battery to electrical devices (not shown) within the engine compartment 12, or to an interior or exterior electrical component (not shown) of the assembly 10 when the assembly 10 is configured as a vehicle as shown. The installed components 20 are typically mated in such an embodiment via a snap-fit or other secure connection so as to complete a particular loop of an electrical circuit. As such, the installed components 20 form an example of the type of installed component for which post-installation inspection is required. Such an example is also relevant in that multiple electrical end connectors may be identically configured and used throughout the wiring harness 16, which can make the individual installed components 20 difficult to differentiate from each other, and thus further complicate the overall inspection process.

Automatic inspection and verification of the proper installation of the installed components 20 is provided by a handheld inspection device 50 having a controller 60. An operator 11 may use the handheld inspection device 50 to quickly and automatically locate, identify, and inspect each of the installed components 20 while also generating an inspection record of the results. The handheld inspection device 50 may be embodied as a tablet computer or other portable electronic device having a display screen 51 receiving input signals (arrow 17 of FIG. 2) describing the particular component to be inspected, and providing instant visual indication and feedback to the operator 11 according to a particular sequence of component acquisition/location, identification, and inspection. The display screen 51 may be embodied as a color touch-sensitive screen responsive to a touch input from the operator 11 as set forth below, and operable to display acquisition guide lines as graphical overlays indicating, for instance, at least the edges of the component 20 to be located and inspected. In this manner, the controller 60 progressively informs the operator 11 as to the status and results of the ongoing inspection.

Figure 2:
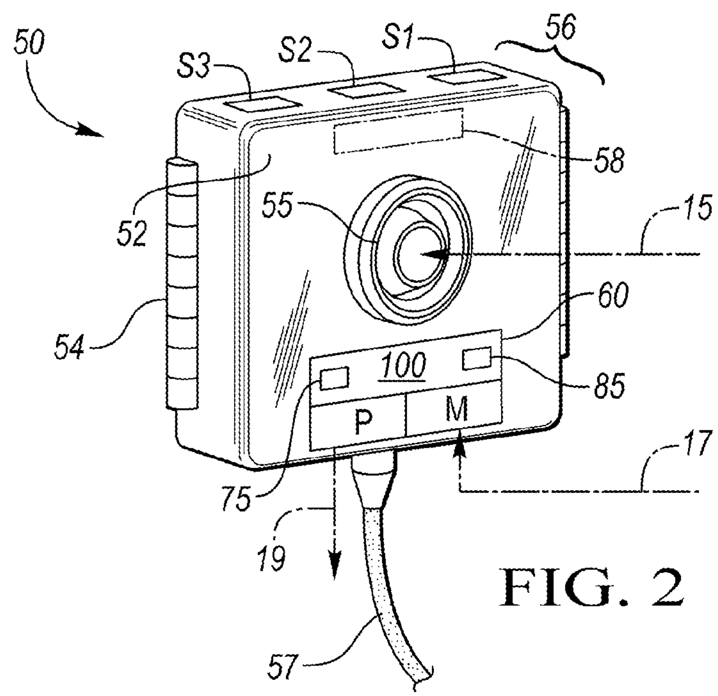
FIG. 2 is a schematic perspective view illustration of an example embodiment of the handheld inspection device shown in FIG. 1.

Referring to FIG. 2, the handheld inspection device 50, which may include a rugged, lightweight outer case 52 and handles 54, includes all of the necessary hardware and software required to execute instructions embodying a method 100, an example of which is set forth below with reference to FIG. 4. The handheld inspection device 50 enables machine vision gaging of the installed components 20. The handheld inspection device 50 provides object or feature location and guidance without the use fixtures or other static infrastructure, thus enabling the operator 11 to hold and manually aim the handheld inspection device 50 and perform the required component inspection.

To accomplish the desired inspection, the handheld inspection device 50 may include a digital camera 55 in communication with the controller 60. The digital camera 55 is operable for collecting a dynamic pixel image in real time, as indicated generally via arrow 15, of the installed components 20 at specified levels of resolution as set forth below, and for providing the collected pixel image (arrow 15) to a processor (P) for use in certain steps of the method 100. The method 100 may progress in terms of adjustment of the resolution of the pixel image (arrow 15) such that the digital camera 55 provides a lower-resolution image for an initial target acquisition stage and a higher-resolution image for a subsequent inspection stage of the method 100.

Figure 3A:
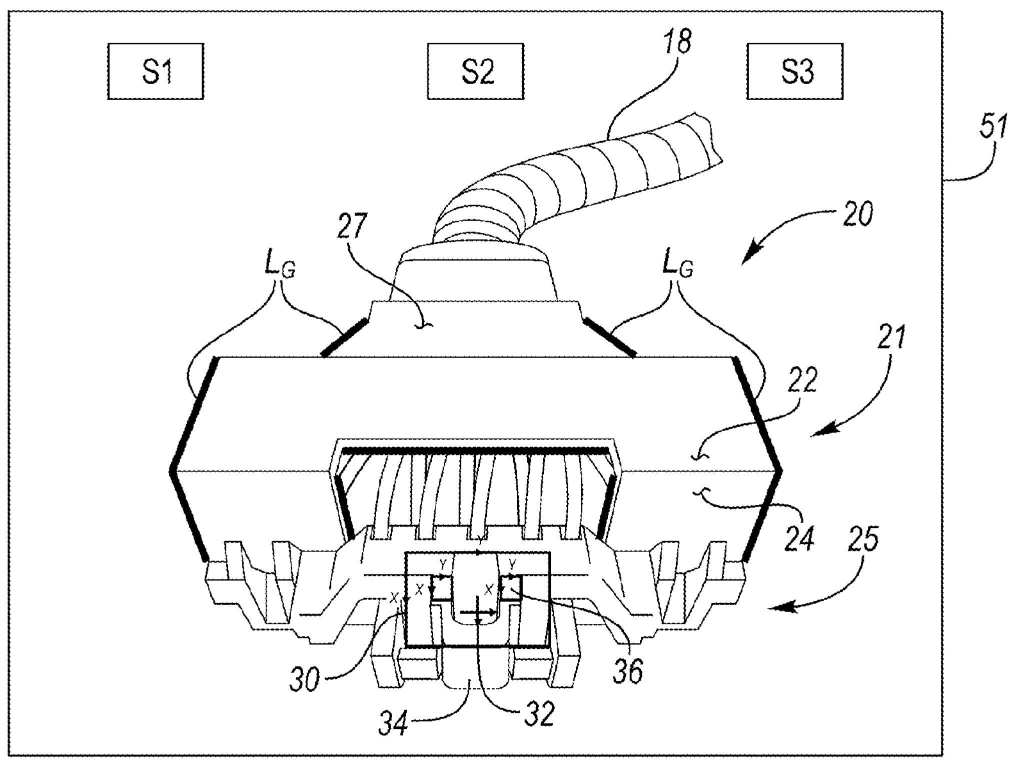
FIGS. 3A and 3B are perspective view illustrations of a properly installed and an improperly installed example component, respectively, as viewed on a display screen of the guided device shown in FIGS. 1 and 2.
Figure 3B:
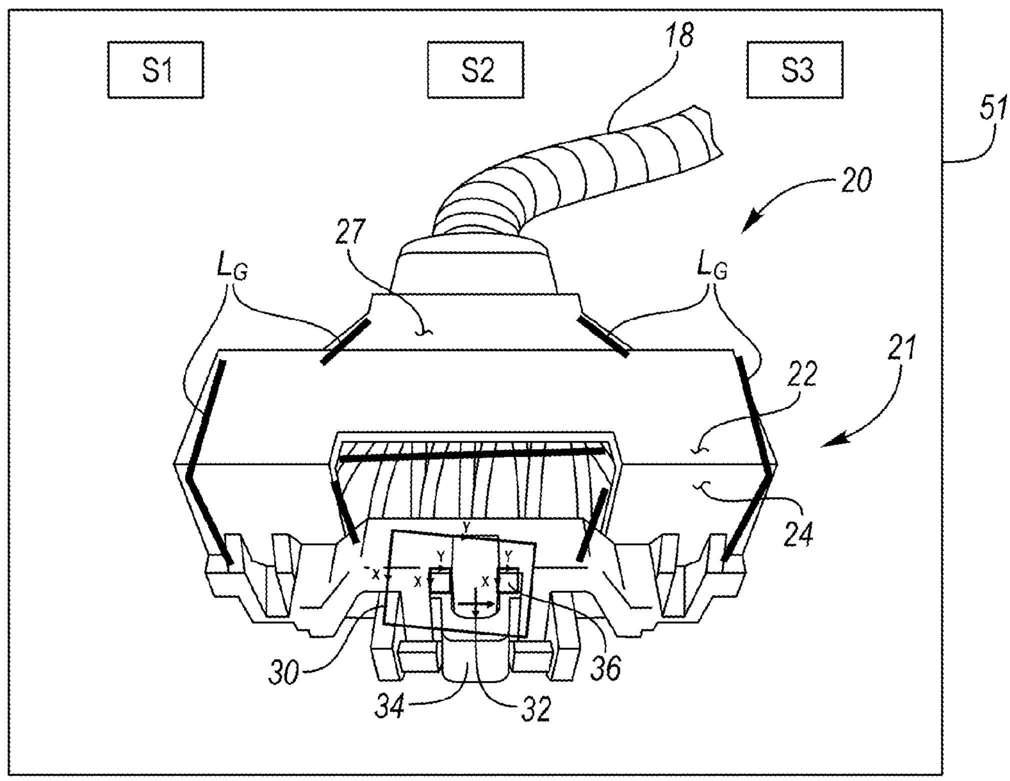

In addition to memory (M) and the processor (P), the controller 60 of the handheld inspection device 50 may include other required hardware such as a light 58 for illuminating the installed components 20 during imaging and a set of status indicators 56, depicted as status indicators S1, S2, and S3, e.g., lamps positioned on or within a surface of the case 52 in FIG. 2, and/or displayed on the display screen 51 as shown in FIGS. 3A and 3B. The controller 60 includes image processing instructions 75 and component information 85 recorded in memory (M), as well as a high-speed clock, analog-to-digital and/or digital-to-analog circuitry, a timer, input/output circuitry and associated devices, signal conditioning and/or signal buffering circuitry. The memory (M) should include sufficient tangible, non-transitory memory such as magnetic or optical read-only memory, flash memory, etc., as well as random access memory, electrically erasable programmable read only memory, and the like. All electrical power and communications with the handheld inspection device 50 may be provided via a master control cable 57, which in turn may communicate inspection results as a data file as part of an output signal (arrow 19) transmitted to an offline database management system (not shown) for subsequent processing and storage of inspection results.

A principle of operation of the handheld inspection device 50 is the targeted use of machine vision gaging to the inspection of installed components. That is, common machine vision-based functions such as pattern recognition via neural network processing or the use of state machines are dispensed with in favor of distance gaging with image resolution progression to achieve multi-stage target acquisition, identification, and inspection. As is known in the art, machine vision gaging involves the imaging of an installed component 20, such as the example electrical connectors of FIGS. 1 and 3A-3B, with foreknowledge of image resolution and the physical size of the imaged target, and measuring linear distances between points of interest within the collected image. While multiple cameras may be used to provide stereo vision and 3D functionality when needed for depth gaging, a single camera gaging design as shown in FIGS. 1 and 2 can operate in two dimensions for added simplicity and ease of programming.

With respect to the digital camera 55 of FIG. 2, in order to facilitate machine vision-based gaging, the pixel image (arrow 15) consists of square pixels. In various embodiments, the digital camera 55 may be configured as a charged-couple device (CCD) or a liquid lens camera. The processor (P), by executing the image processing instructions 75, is able to measure distance to a fraction of a pixel between identified edges denoted by the acquisition guide lines generated by the processor (P) as set forth below. The digital camera 55 should be used in proper lighting so that the imaged target is properly illuminated. Such lighting could be optionally included within the case 52 or connected to the case 52, e.g., as shown with the light 58 of FIG. 2, so as to illuminate any objects in the field of view of the digital camera 55, particularly the edges of the image (arrow 15), with sufficient illumination of any edges of the installed components 20.

Also included in the memory (M) is the predetermined component information 85 noted briefly above. The predetermined component information 85 describes the installed component 20 to be acquired and inspected via the handheld inspection device 50. The predetermined component information 85 may include the model number, quantity, and correct installed relative distances and orientations of the installed component 20, e.g., the male/female portions of the example electrical connectors of FIGS. 1, 3A, and 3B. In keeping with the example of the electrical connectors, the memory (M) may be populated with a list of all of the electrical connectors and their general locations within the assembly 10 shown in FIG. 1.

Thus, the operator 11 may be prompted to the general location, such as by displaying a message via the display screen 51 informing the operator 11 to "electrical connectors/wiring harness/engine compartment". Likewise, the boundaries of the environment of the installed component 20 are fixed and thus provide a known reference frame. For example, if the installed components 20 are the example electrical connectors described above, the locations of any walls of the engine compartment 13 and/or of any other fixed surfaces therein may be programmed into memory (M) and used to distinguish one electrical connector from another during the inspection.

The above function and structure of the handheld inspection device 50 will now be described with particular reference to FIGS. 3A and 3B. FIG. 3A depicts an example of a properly installed component 20 in the form of an electrical connector disposed at an end of the electrical cable 18. The installed component 20 includes a first component 21 and a second component 25. While the particular structure and function of the first and second components 21 and 25 are not relevant to conducting the inspection process, for illustrative purposes the first component 21 may be a wiring plug and the second component 25 may be a wiring jack, or vice versa.

FIG. 3B depicts an example of an improperly installed component 20. The differences between FIGS. 3A and 3B are subtle, as an incorrectly installed component 20 may be incorrect only to a minor degree, such as when an operator fails to fully secure one side of an electrical connector such that the first component 21 is slightly askew relative to the second component 25 as opposed to being fully disconnected, with the latter being a problem that would be easy to visually verify without the aid of the handheld inspection device 50. The handheld inspection device 50 is therefore configured for the inspection and detection of such difficult to detect alignment issues, which are nevertheless indicative of an improperly installed component and are therefore performance critical.

With respect to FIG. 3A, as part of the present approach a set of virtual acquisition guidance lines $L_G$ are projected onto the display screen 51. Each projected acquisition guidance line $L_G$ corresponds to a linear edge of the installed component 20, e.g., of a top surface 22, a front surface 24, and a trailing surface 27 of the first component 21. The acquisition guidance lines $L_G$ provide target boundaries to the operator 11 of FIG. 1 in the target acquisition stage. That is, once the handheld inspection device 50 is informed via user input signals (arrow 17 of FIG. 2) as to the particular inspection to be conducted, e.g., a selected installed component 20 to be inspected and its location in the assembly 10, the processor (P) extracts the required parameters from memory (M) by accessing the stored component information 85 describing the installed component 20.

The use of the acquisition guidelines $L_G$ assists the operator 11 in locating and "locking on" to the component 20 in a manner akin to the use of a heads up display in a combat aircraft. The digital camera 55 may initially collect a low-resolution image of the installed component 20 while target acquisition is ongoing, with the processor (P) commanding activation or display of a first status indictor S1 of FIG. 2 when the target is correctly acquired. Again, the first status indicator S1 may reside anywhere in the handheld inspection device 50, so this function may be embodied as a visual indication on the display screen 51 itself as shown in FIGS. 3A-3B as opposed to, or in conjunction with, illumination of an indicator lamp somewhere on the case 52.

Also depicted in FIG. 3A is a target inspection region 30. Once the first status indicator S1 is illuminated, thereby indicating identification of the installed component, the processor (P) automatically switches to higher resolution imaging of the target inspection region 30, which contains the area of measurement for the inspection. Once the target inspection region 30 has been imaged at a higher resolution level relative to the resolution of the target acquisition stage, a second indicator S2 as shown in FIG. 2 may be illuminated to convey to the operator 11 that the installed component 20 has been located, the controller 60 is "locked on", and the machine gaging inspection has begun.

For this inspection, the processor (P) automatically gages the distances of a predetermined feature. For example, the first component 21 may include a tab 34 that, when the first and second components 21 and 25 are properly installed, is separated from the second component 25 by a gap 36 of two known dimensions, indicated as x and y in FIG. 3A. The gaps 36 may serve as the feature in this instance. A secondary reference area 32 within the target inspection region 30, e.g., an edge surface of the tab 34, may form a known reference point or line for evaluating the size of the gap 36. Size can be determined with respect to linear distance, with relative determinations made by the processor (P) in terms of perpendicular distance to a reference surface or parallel measurements.

An example of improper installation can be seen in FIG. 3B, with the virtual guidance lines $L_G$ indicating that the target has not been acquired, and the target inspection region 30 depicts an incorrect or unexpected orientation of the tab 34. The gaps 36 are thus larger in FIG. 3B relative to how the same gaps 36 appear in FIG. 3A. In such a case, a third indicator S3 as shown in FIG. 2 may be illuminated via the controller 60 of FIG. 2, such as in red, to indicate a failing result or in green when a passing result is determined. The result of the inspection can be output as a data file or other signal via the output signals (arrow 19) depicted in FIG. 2, and the operator 11 can be thereafter prompted to the next inspection location.

Figure 4:
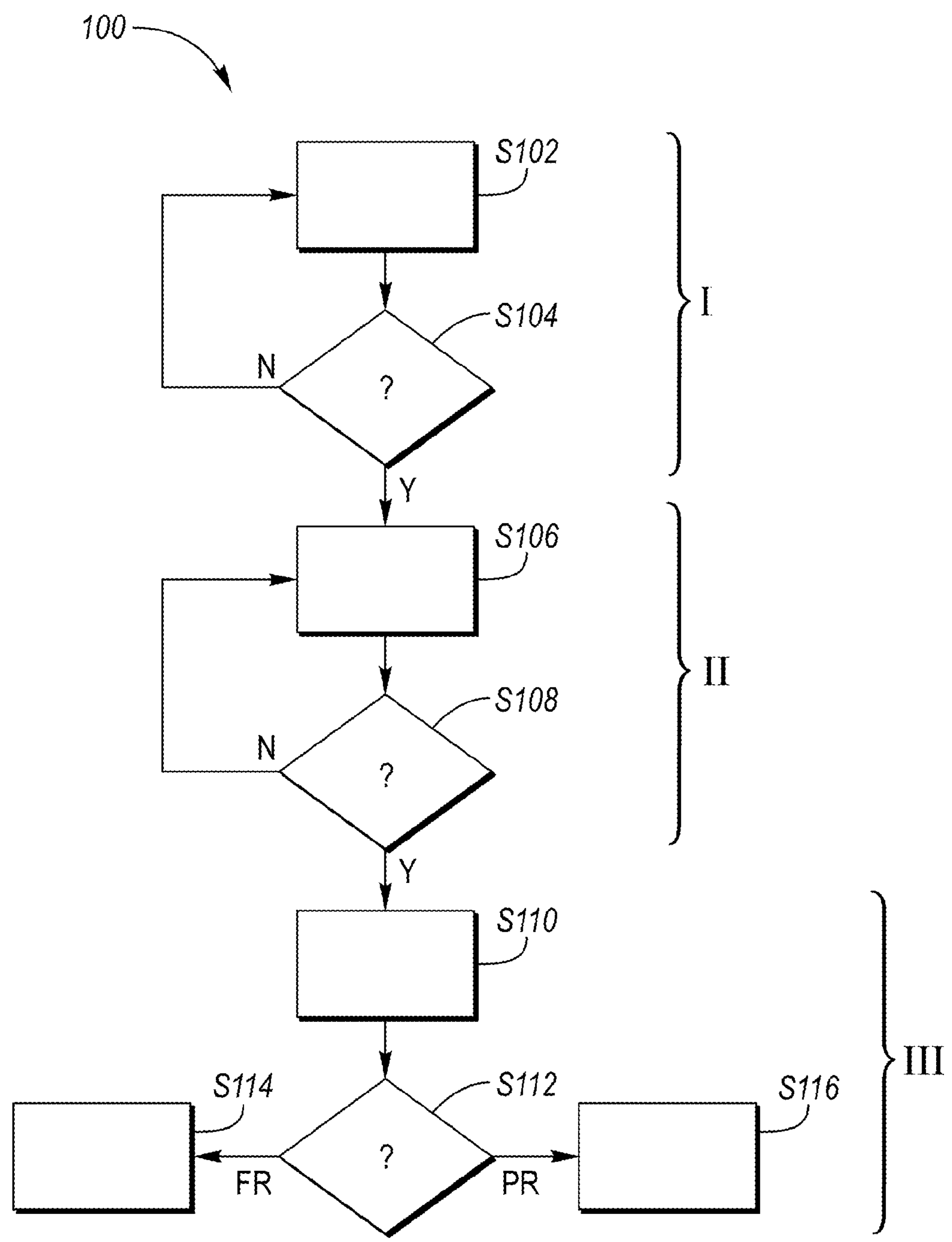
FIG. 4 is a flow chart describing an example embodiment of the present method.

Referring to FIG. 4, the approach outlined generally above with reference to FIGS. 1-3B can be accomplished via execution of the method 100. The method 100 enables a component inspection process that proceeds in three discrete stages, i.e., a target acquisition stage (I), a target identification stage (II), and an inspection stage (III). Stage I commences with step S102, wherein the handheld inspection device 50 is prompted via the input signals (arrow 17 of FIG. 2) as to the particular component that is to be inspected. For instance, a list of all possible inspection processes of the assembly 10 of FIG. 1 may be visually presented to the operator 11 via the display screen 51, and the operator 11 may then select the appropriate inspection task with a simple touch gesture as is well known in the art. Once the task is selected, the processor (P) may select a lower-resolution image mode and continuously present an image of a wide field of view sufficient to capture the component 20, via the display screen 11, at the lower relative resolution, e.g., between 1 MB and 5 MB. In addition, the processor (P) accesses the stored component information 85 pertaining to the component to be inspected and, using this component information 85, generates and displays the acquisition guidance lines $L_G$ of FIGS. 3A and 3B via the display screen 51. The operator 11 is thus visually prompted as to the component 20 to look for.

As part of step S102, the processor (P) may facilitate the task by directing the operator 11 to the correct inspection location. For example, when a number of identically-configured components 20 are present, which is the case in the example wiring harness 16 shown in FIG. 1, the processor (P) may direct the operator 11 to a particular location within the assembly 10, e.g., via a text message or a symbol displayed on the display screen 51. Additionally, the processor (P) may adjust the appearance of the virtual acquisition guidance lines $L_G$ using the known locations and orientations of any static components in the environment, e.g., the walls of the engine compartment 13 of FIG. 1 or any other surrounding structure. That is, as the processor (P) is aware of where each of the components 20 should reside with respect to the other structure in the surrounding environment, the processor can broadly cue the operator 11 as to where to look as part of step S102, or to how the installed component 20 should be oriented at a particular location. The method 100 proceeds to step S104 when the acquisition guidance lines $L_G$ are displayed via the display screen 51.

Step S104 entails comparing the size of the edges of the displayed image on the display screen 51 to a predetermined size, using the controller 60 of FIG. 2, to determine if the displayed image corresponds to the component 20 initially selected at step S102. The purpose of step S104 is to ensure that the operator 11 has located the correct installed component 20. If the installed component 20 is the correct one, the method 100 may include activating or displaying the first indicator S1 so as to alert the operator 11 to the status before proceeding to step S106. Otherwise, steps S102 and S104 are repeated. For example, the first indicator S1 could be illuminated in red until it is eventually illuminated in green if desired, or the first indicator S1 may remain off until the target is correctly acquired.

At step S106, the method 100 moves into phase II of the inspection process wherein the controller 60 next switches the resolution of the digital camera 55 to higher-resolution relative to that used for target acquisition (phase I) and more closely focuses on the target inspection region 30. The secondary reference area 32 within the target inspection region 30, e.g., an edge surface of the example tab 34 shown in FIGS. 3A and 3B, provides a known frame of reference. The method 100 proceeds to step S108 as this stage of the inspection progresses.

At step S108 of phase II the controller 60 next activates or displays the second indicator S2 when the secondary reference area 32 in the target inspection region 30 is properly acquired and displayed. As used herein, "properly" means to the extent required by the processor (P) to proceed with machine vision-based gaging of any structure located within the target inspection region 30. For instance, the processor (P) may compare the quality of the collected pixel image (arrow 15 of FIG. 2) to calibrated resolution and noise standards, and may proceed to step S110 when the collected image is determined to be sufficient for proceeding with gaging.

Step S110 entails measuring predetermined linear distances of a predetermined feature or another feature quality within the target inspection region 30. For example, using the example of the electrical connector, the first and second components 21 and 25, properly installed, are separated by a gap 36 of known xy dimensions, with the gaps 36 serving as one possible inspection feature. The measured size of the gaps 36 can be temporarily recorded in memory (M), and may be determined with respect to measured distance, perpendicular distance to a reference surface, or parallel measurements.

At step S112, the controller 60 next evaluates the gaging measurements of the target feature(s) from step S110 against a corresponding calibrated standard. For instance, the controller 60 can determine whether or not two surfaces that should be parallel to each other in a correctly installed example are in fact parallel to each other. Or, a linear distance between a surface of the installed component 20 can be compared to a fixed surface of a reference portion of the assembly 10 or to another surface of the installed component 20. The method 100 proceeds to step S114 if the target feature does not conform to the calibrated standard, and to step S116 in the alternative if the target feature does conform to the calibrated standard.

Step S114 may entail executing a first control action. For example, the controller 60 may activate or display the third indicator S3 in red or with another suitable color or quality providing a displayed status symbol. The controller 60 may also output a failing test result (FR) as part of the output signals (arrow 19 of FIG. 19) to an offline server or database management system (not shown) recording the inspection result, or may prompt the operator 11 to repeat the inspection.

Step S116 may entail executing a second control action. For example, the controller 60 may activate or display the third indicator S3 in green or with another suitable color or descriptive quality to thereby display a corresponding status symbol. The controller 60 may also output a passing test result (PR) to an offline server (not shown) recording the result, or may prompt the operator 11 to repeat the inspection.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for inspecting an installed component, the installed component including first and second mated pieces, the method comprising:

receiving an identity and selected location of the installed component as an input signal via a handheld inspection device, the handheld inspection device having a controller, a digital camera, and a display screen;

collecting a dynamic pixel image of the selected location in real-time using the digital camera;

displaying the collected dynamic pixel image in real-time via the display screen;

determining, via the controller from the identity and selected location, a set of virtual acquisition guidance lines calibrated to align with designated edges of the installed component in the displayed dynamic pixel image;

superimposing the virtual acquisition guidance lines onto the displayed dynamic pixel image via the display screen such that the virtual acquisition guidance lines correspond to the designated edges of the installed component within the selected location;

confirming the identity of the installed component in the selected location via the controller responsive to the edges of the installed component in the displayed dynamic pixel image aligning with the projected acquisition lines;

identifying a predetermined area of the installed component via the controller after confirming the identity of the installed component;

measuring, via the controller using image processing instructions, a predetermined feature dimension between the first and second mated pieces of the installed component within the identified predetermined area; and generating an output signal via the controller with a status that is indicative of the first and second pieces being properly mated responsive to the measured feature dimension falling within a calibrated range.

2. The method of claim 1, further comprising: activating or displaying a corresponding one of a plurality of status indicators on the handheld inspection device in response to confirming the identity of the installed component in the selected location, the predetermined area being identified, and/or the measured feature dimension being within the calibrated range.

3. The method of claim 2, wherein the handheld inspection device includes a case and a plurality of lights connected to the case, and wherein the each of the plurality of lights acts as a corresponding one of the plurality of status indicators.

4. The method of claim 2, wherein activating or displaying one of a plurality of status indicators includes displaying a status symbol on the display screen.

5. The method of claim 1, wherein collecting a dynamic pixel image via the digital camera includes using a charge coupled device or a liquid lens camera as the digital camera.

6. The method of claim 1, further comprising using the controller to automatically increase a pixel resolution of the digital camera after identifying the installed component in the selected location.

7. A handheld inspection device comprising:

a digital camera;

a display screen; and a controller having a processor and image processing instructions, wherein the controller is programmed to execute the image processing instructions and thereby:

receive an identity and a selected location of an installed component as an input signal, the installed component including first and second mated pieces;

collect a dynamic pixel image of the selected location in real-time using the digital camera;

display the collected dynamic pixel image in real-time via the display screen;

determining, via the controller from the identity and selected location, a set of acquisition guidance lines calibrated to align with designated edges of the installed component in the displayed dynamic pixel image;

superimposing the acquisition guidance lines onto the displayed dynamic pixel image via the display screen such that the virtual acquisition guidance lines correspond to the designated edges of the installed component within the selected location;

activate a first indicator in response to the edges of the installed component within the displayed dynamic pixel image aligning with the projected acquisition lines;

activate a second indicator in response to a predetermined area of the installed component being identified;

measure, via the processor, a predetermined feature dimension between the first and second mated pieces of the installed component within the identified predetermined area; and activate a third indicator and generate an output signal via the processor, wherein the third indicator has a status indicative of the first and second pieces being properly mated responsive to the measured feature dimension falling within a calibrated range.

8. The handheld inspection device of claim 7, further comprising a case housing the digital camera, the display screen, and the controller.

9. The handheld inspection device of claim 8, wherein the case includes a pair of handles.

10. The handheld inspection device of claim 7, further comprising a plurality of lights connected to the case, wherein each of the lights acts a corresponding one of the first, second and third indicators.

11. The handheld inspection device of claim 7, wherein each of the first, second and third indicators corresponds to a status symbol displayed on the display screen.

12. The handheld inspection device of claim 7, wherein the digital camera is a charge coupled device.

13. The handheld inspection device of claim 7, wherein the digital camera is a liquid lens camera.

14. The handheld inspection device of claim 7, wherein the controller is configured to automatically increase a pixel resolution of the digital camera after identifying the installed component in the selected location.

15. An electronic inspection system for inspecting installed components of a motor vehicle, the electronic inspection system comprising:

a digital camera configured to capture dynamic pixel images;

a user interface with an electronic display screen and an input device; and a controller communicatively connected to the digital camera and the user interface, the controller being programmed to:

receive, from the input device of the user interface, a user input signal indicative of a component identity and location within the motor vehicle of an installed component, the installed component including first and second mated pieces;

receive, from the digital camera, signals of real-time dynamic pixel images of the installed component and the selected location within the motor vehicle;

direct the display screen to display in real-time the dynamic pixel images;

determine, from the received component identity and location, a set of acquisition guidance lines calibrated to align with designated edges of the installed component;

direct the display screen to display the acquisition guidance lines superimposed onto the installed component displayed in the dynamic pixel images;

responsive to the superimposed acquisition guidance lines aligning with the corresponding designated edges of the installed component within the selected location, confirm the component identity of the installed component;

determine, from the confirmed component identity, a target inspection area corresponding to the installed component;

measure a feature dimension between the first and second mated pieces of the installed component within the target inspection area; and responsive to the measured feature dimension falling within a calibrated range, output a status indicator indicating that the first and second pieces are properly mated and the installed component is properly installed in the motor vehicle.

16. The electronic inspection system of claim 15, wherein the controller is further programmed to:

activate a first status indicator responsive to the acquisition guidance lines being superimposed onto and aligning with the corresponding designated edges of the installed component thereby confirming the component identity;

activate a second status indicator responsive to the target inspection area being identified and displayed via the display device; and activate a third status indicator responsive to the measured feature dimension being within the calibrated range.

17. The electronic inspection system of claim 16, wherein activating each of the first, second and third status indicators includes displaying a respective status symbol on the display screen of the user interface.

18. The electronic inspection system of claim 15, further comprising a case, wherein the digital camera, the user interface, and the controller are mounted to the case.

19. The electronic inspection system of claim 15, wherein the display screen displaying the real-time dynamic pixel images includes: first, displaying the real-time dynamic pixel images of the installed component at a first resolution to confirm the component identity; and, second, displaying the real-time dynamic pixel images of the installed component at a second resolution, higher than the first resolution, to measure the feature dimension.

20. The electronic inspection system of claim 15, wherein the feature dimension includes a gap of designated dimensions separating the first and second mated pieces, and wherein the measuring includes evaluating a size of the gap of the installed component displayed in the dynamic pixel images.

* * * * *